United States Patent
Chamberlain et al.

(10) Patent No.: US 6,427,236 B1
(45) Date of Patent: Jul. 30, 2002

(54) METHOD FOR INSTALLING A PATCH BASED ON PATCH CRITICALITY AND SOFTWARE EXECUTION FORMAT

(75) Inventors: Benjamin C. Chamberlain; D. Gordon Hardy; Darrin N. Hatakeda, all of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/262,166

(22) Filed: Mar. 3, 1999

(51) Int. Cl.$^7$ ............................................... G06F 9/445

(52) U.S. Cl. ....................................................... 717/174

(58) Field of Search ................... 717/11, 174, 168–173, 717/175–178, 162–165, 167, 154, 158, 130–131, 120; 709/219, 227; 711/102, 165; 714/9

(56) References Cited

U.S. PATENT DOCUMENTS

| | | | |
|---|---|---|---|
| 6,052,531 A | * | 4/2000 | Waldin, Jr. et al. ......... 717/170 |
| 6,135,651 A | * | 10/2000 | Leinfelder et al. .......... 717/168 |
| 6,199,203 B1 | * | 3/2001 | Saboff ......................... 717/168 |
| 6,199,204 B1 | * | 3/2001 | Donohue .................... 717/178 |

OTHER PUBLICATIONS

Kelly, Gain Control of Application Setup and Maintenance with the New Windows Installer, Sep. 1998, Microsoft System Journal.*

Kelly, M., "Gain Control of Application Setup and Maintenance with the New Windows Installer," *Microsoft Systems Journal*, Sep. 1998, pp. 15–27.

* cited by examiner

*Primary Examiner*—Gregory Morse
*Assistant Examiner*—Hoang-Vu Antony Nguyen-Ba
(74) *Attorney, Agent, or Firm*—Christensen O'Connor Johnson Kindness PLLC

(57) ABSTRACT

A method and computer-readable-medium for installing a patch to a computer application program based on the criticality of the patch and the execution format of the computer application are disclosed. An installer program installs application programs. The installer program also stores related information, including an execution format, in a configuration database. The execution format is either Run-Locally or Run-From-Source. If the execution format is Run-From-Source, the application or features that are designated as Run-From-Source are read-only and are executed from a source, such as from a CD-ROM. Since Run-From-Source executions run from a read-only source, patches cannot be directly applied. When a patch is authored, information as to the criticality of the patch is stored with the patch. Preferably, the criticality is specified based on a feature. When an installer program applies a patch, the installer program queries the execution format. Any features that are Run-Locally can be patched. If a feature is Run-From-Source, a query is made as to whether the feature is critical. If the patch is critical for a feature, the feature is installed, the execution format is changed to Run-Locally, and the patch is applied. If the patch is not critical for a Run-From-Source feature, the patch is not applied. The configuration database is updated during processing to reflect what features have been patched, and what features have not been patched.

8 Claims, 4 Drawing Sheets

METHOD FOR INSTALLING A PATCH BASED ON PATCH CRITICALITY AND SOFTWARE EXECUTION FORMAT

RELATED APPLICATIONS

This application is related to the following U.S. patent application: U.S. patent application Ser. No. 09/261,864 entitled "System and Method for Patching an Installed Application Program," which was filed concurrently and is assigned to the same assignee as this application.

FIELD OF THE INVENTION

This invention relates generally to the installation of software applications on a computer system, and more specifically, to maintaining installation configuration information for future modifications to the installed software application.

BACKGROUND OF THE INVENTION

Software application installation is an area of increasing importance. Unfortunately, existing installation technologies fail to address all of a computer user's needs. Most installation technologies are simply brute-force mechanisms for copying program files from one location to another. Only one known installer program, Microsoft Windows Installer, developed by Microsoft Corporation, Redmond, Wash., even comes close. For a description of Microsoft Windows Installer, see Kelly, Mike, "Gain Control of Application Setup and Maintenance with the New Windows Installer", *Microsoft Systems Journal*, pp. 15–27, September 1998.

The one installer program that comes close to addressing all of the computer user's needs manages the installation of an application so that information related to each. of the application's resources is stored in a "configuration database." The configuration database may be registry keys within a system registry, or it may be a stand-alone database. The stored information includes, but is not limited to, the installed state of the application, i.e., what features of the application are or are not installed, whether the application should be run locally or run from a source, paths to the program files of the application, whether features are "advertised" (i.e., available but not installed), etc. The stored information is stored at install time and is used by the installer program to ensure that an application always has available the resources that it expects or that the user requests. For instance, one function of the installer program is to verify the existence of a resource needed by the application. When the application requests a path to a program file, the installer program verifies the existence of that program file at the expected location stored in the configuration database. If, for some unexpected reason, the program file does not exist at the expected location, the installer program installs the program file prior to returning its path to the application. The installer program continually updates the configuration database if any changes are made to the installed state of the application.

Generally speaking, "patching" refers to the art of modifying or updating an application from one state to another state. Often, patching is performed if an application is in need of a service release or update to remedy a programming bug or other infirmity. Patching is traditionally performed by executing a patching application, which makes minor modifications to the installed application's files or resources.

When a product is installed, an execution format is designated. The execution format can apply to the product, or to features of the product. The execution format can be run from source (e.g., run from the original location, such as a CD-ROM, or run from a network server disk), or it can be run locally. The installer program can determine whether the product is to be run from source or run locally. Alternatively, the user may have the option of whether to run locally or run from source. If the product is to be run locally (either as designated by the product installation program, or as selected by the user), the user may also be able to specify where to load the program (i.e., path).

In the past, if a user wanted to apply a patch to an application program that was installed to run from source, the user was required to install the application program to run locally before applying the patch. This not only requires more work on the part of the user, but it also requires the user to make the decision if the patch is critical, and then take the action to install the product so that it can run locally.

Accordingly, there exists a need in the art for an improved method of patching a software program that can determine whether the execution format of the software program is run from source or run locally, and maintain the existing execution format, if possible.

SUMMARY OF THE INVENTION

The present invention is directed to a method, and computer-readable medium for preserving an execution format after patching a software program using an installer program. The installer program determines the execution format of each of the features of the software program. The execution format for each feature is either Run-Locally or Run-From-Source. If the execution format for a feature is Run-Locally, the feature has been installed locally. If the execution format for a feature is Run-From-Source, the feature has not been installed locally, but is available for execution. If the execution format for a feature is Run-From-Source, the installer program determines if the patch is critical for that feature. If the patch is critical for the feature, the installer program changes the execution format for the feature to Run-Locally because the user usually cannot write to the source (e.g., a read-only CD), or does not have permission to write to the network location.

In accordance with still other aspects of the present invention, those features that are changed to Run-Locally are installed locally. Information relating to where the feature is installed is also stored in a configuration database.

In accordance with further aspects of the invention, whether the patch is critical is included with the patch. Preferably, whether a patch is critical is determined on a feature basis.

In accordance with still further aspects of the invention, the application being patched is installed prior to applying the patch. Installing the application includes determining and storing an execution format. Preferably, the execution format is stored on a feature basis.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Exemplary Computing Environment

Figure 1:
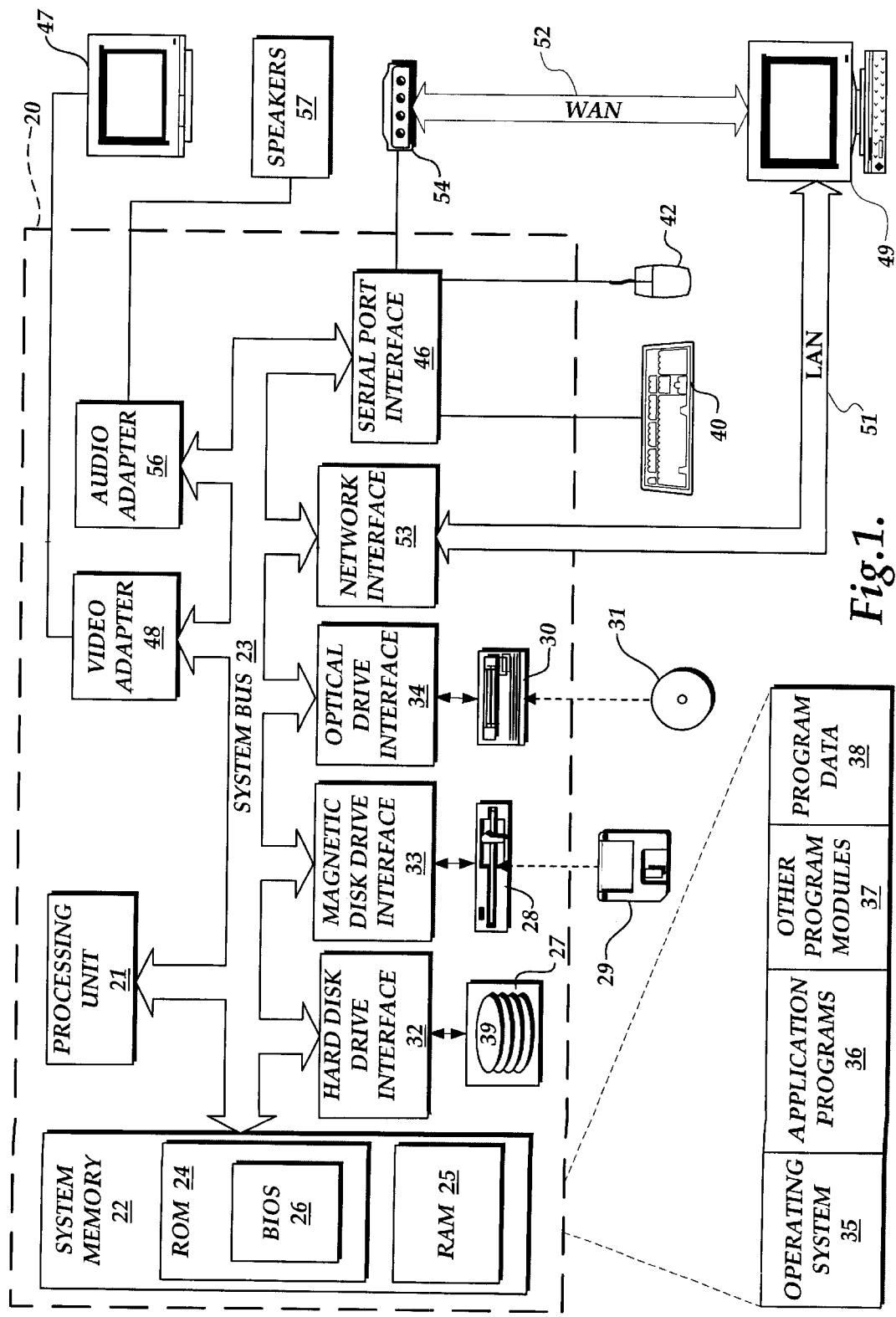
FIG. 1 is a block diagram of a general purpose computer system suitable for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37, including an installer program, and program data 38, including a configuration database. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

Discussion of Terminology

Figure 2:
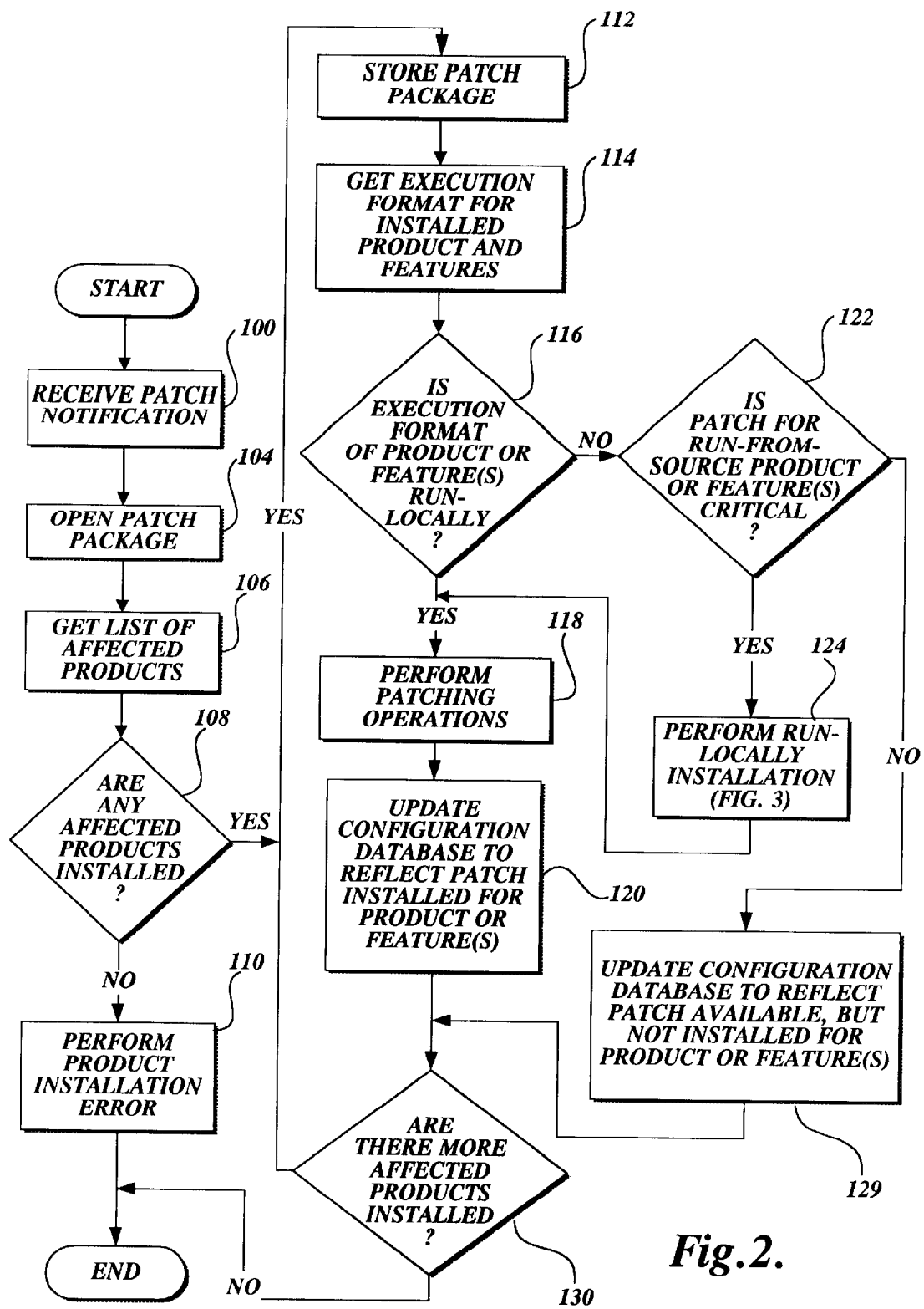
FIG. 2 is a flow diagram illustrating the logic performed by an installer program for preserving an execution format after patching an application performed in accordance with the present invention.

Before discussing FIG. 2, a brief discussion of terminology is needed. In accordance with an exemplary embodiment of the present invention, the installer program module 37 recognizes three principal elements: products, features and components. A "product" represents a single, entire application program, such as the "MICROSOFT WORD" application program marketed by Microsoft Corporation of Redmond, Wash. Each product has a globally unique identifier known as a Product Code that allows each product to be distinguished. Each product is made up of one or more features. A feature is a granular piece of the product that a user may choose to install or execute. Features typically correspond roughly to the functional features of the product itself, such as a "Proofing Tools" feature. Each feature is essentially a grouping of components and may also include other features. Features need not be globally unique, and therefore may be identified by any appropriate means, such as with a textual feature identifier.

A component is a collection of resources, such as files or registry keys, that are all installed or uninstalled as a unit. Components are the building blocks of the product that are not exposed to the user. A resource, such as a file or a registry key, may be part of only one component. Two components may not share the same resource whether they are part of the same product or parts of different products. Each component has a globally unique identifier known as a Component Code. One resource within the component is designated as a key file. The key file may be any resource, such as a file or registry key, within the component.

An installer program is used to install an application program. During the installation of an application program, a determination is made as to the execution format for each of the features of an application. The execution format may be determined in a variety of ways, for example, based on existing settings; pre-determined by the author of the application; or based on user preferences. The execution format can be Run-Locally or Run-From-Source. If the execution format is Run-Locally, the resources for the feature are installed on the local machine. If the execution format is Run-From-Source, the resources for the feature are left on the source, e.g., CD-ROM.

Installation of a Patch While Preserving Execution Format

FIG. 2 is a flow diagram illustrating the logic of preserving the execution format of an installation performed in accordance with the present invention. The logic of FIG. 2 begins in a start block and proceeds to block 100 where a patch notification is received. When a command to perform a patch is received, an installation file is received, along with a patch package. Details of patching including a description of a patch package are disclosed in co-pending U.S. patent application Ser. No. 09/261,864 entitled "System and Method for Patching an Installed Application Program," filed concurrently herewith. The patch package is then opened in block 104. Next, in block 106, a list of affected products is obtained from the patch package. The logic then proceeds to decision block 108 where a test is made to determine if there are any affected products installed. The configuration database contains information about all of the installed products. Therefore, a determination can be made by checking the configuration database as to whether any affected products are installed. If there are not any affected products installed, the logic moves to block 110 where a product installation error is performed. For example, an error message is displayed. The logic then ends.

If however, in decision block 108, it is determined that there are affected products installed, the logic moves to block 112 where the patch package is stored. The logic then moves to block 114 where the execution format is obtained for each feature of an installed product. An installed product can be entirely Run-From-Source, entirely Run-Locally, or some features may be Run-Locally, while other features are Run-From-Source. The logic then moves to decision block 116 where a test is made to determine if the execution format for the product or any of the installed features of the product is Run-Locally. If so, patching operations are performed in block 118. Patching operations are disclosed in co-pending U.S. patent application entitled "System and Method for Patching an Installed Application Program," more fully referenced above. After patching operations have been performed, the logic moves to block 120 where the configuration database is updated to reflect the fact that the patch was installed. Next, the logic moves to decision block 130 where a test is made to determine if there are more affected products installed. If so, the logic returns to block 114 where the logic of blocks 114–130 is repeated until there are no more affected products, at which point the logic of FIG. 2 ends.

Figure 3:
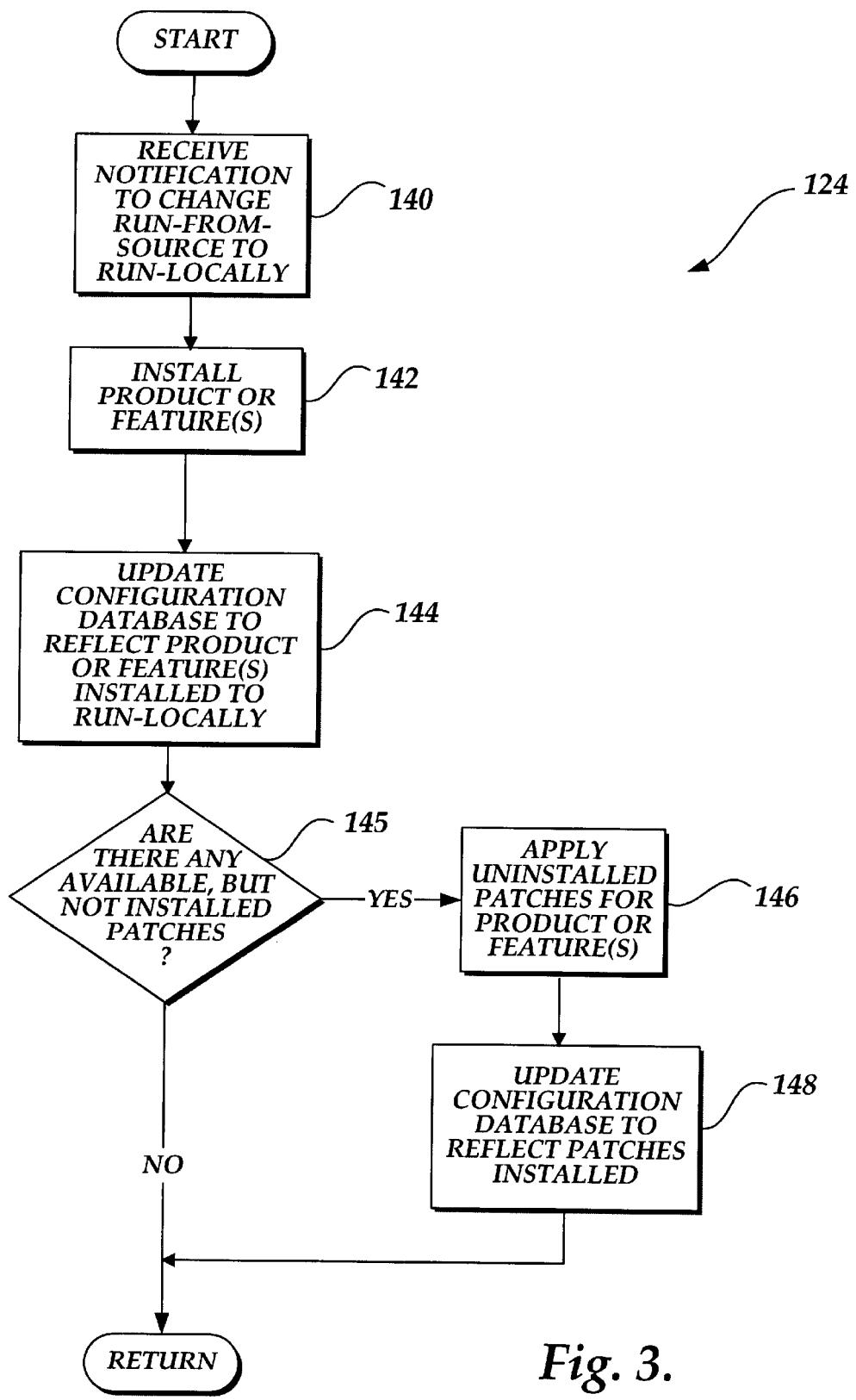
FIG. 3 is a flow diagram illustrating the logic of performing a Run-locally installation.

If however, in decision block 116, it is determined that the execution format is not Run-Locally, the execution format is Run-From-Source, and the logic proceeds to decision block 122 where a test is made to determine if the patch is critical. Preferably, the determination of whether a patch is critical is made by the author and stored within the installation information. It is also preferable that the information regarding whether a patch is critical is determined for each affected feature. In a preferred embodiment, this determination is made on a file basis. If it is determined that the patch is critical, the logic moves to block 124 where a Run-Locally installation is performed. The logic of performing a Run-Locally installation is illustrated in FIG. 3 and described below. If it is determined that the patch is not critical, the logic moves to block 129 where the configuration database is updated to reflect the fact that the non-critical patch is available, but not installed for the Run-From-Source features. The logic then moves to decision block 130 where a test is made to determine if there are more affected products installed. If so, the logic returns to block 114, and the logic for performing patch operations contained in blocks 114–130 is repeated until there are no more affected products installed, at which point the logic of FIG. 2 ends. It will be appreciated that the logic of FIG. 2 has been simplified for ease of readability. Since it is preferable that both the determination of execution format and the criticality of a patch be decided on a feature basis, the logic in the preferred invention loops for affected products. For each affected product, each feature is checked for execution format and criticality. In other words, one level of nesting is not shown in FIG. 2.

FIG. 3 illustrates the logic of performing a Run-Locally installation. As previously stated, individual features of a product can be Run-Locally, while others are Run-From-Source, or all of the product features can be Run-Locally. Therefore, a Run-Locally installation can be performed on a product or on one or more features of a product. While the illustrated embodiment illustrates the Run-Locally installation occurring based on the installation of a critical patch to a Run-From-Source product or feature(s) (block 124 of FIG. 2), it will be appreciated that the logic of performing a Run-Locally installation can be invoked in other ways, for example, a user may initiate a change in the configuration to change a product form Run-From-Source to Run-Locally.

The logic of FIG. 3 moves from a start block to block 140 where the installer program receives a notification to change the execution format of a product, or one or more features of a product, from Run-From-Source to Run-Locally. The logic then moves to block 142 where the product or feature (s) are installed. Next, the configuration database is updated to reflect the fact that the product or feature(s) have been installed to Run-Locally. See block 144. The logic then moves to decision block 145 where a test is made to determine if there are any available, but not installed patches for the product or feature(s) that were just installed. If a patch is received, but not installed, the patch is stored and the configuration database is updated to reflect the existence of an uninstalled patch, for example, see block 112 of FIG. 2. Still referring to FIG. 3, if there are any available, but not installed patches, the logic moves to block 146 where the available, but not installed patches for the product or feature(s) are installed. After applying the available, but not installed patches, the logic moves to block 148 where the configuration database is updated to reflect the fact that the patches have been installed. If there are no available patches to install (no in decision block 145), or after the available patches have been installed (block 148), the logic of FIG. 3 ends.

Figure 4:
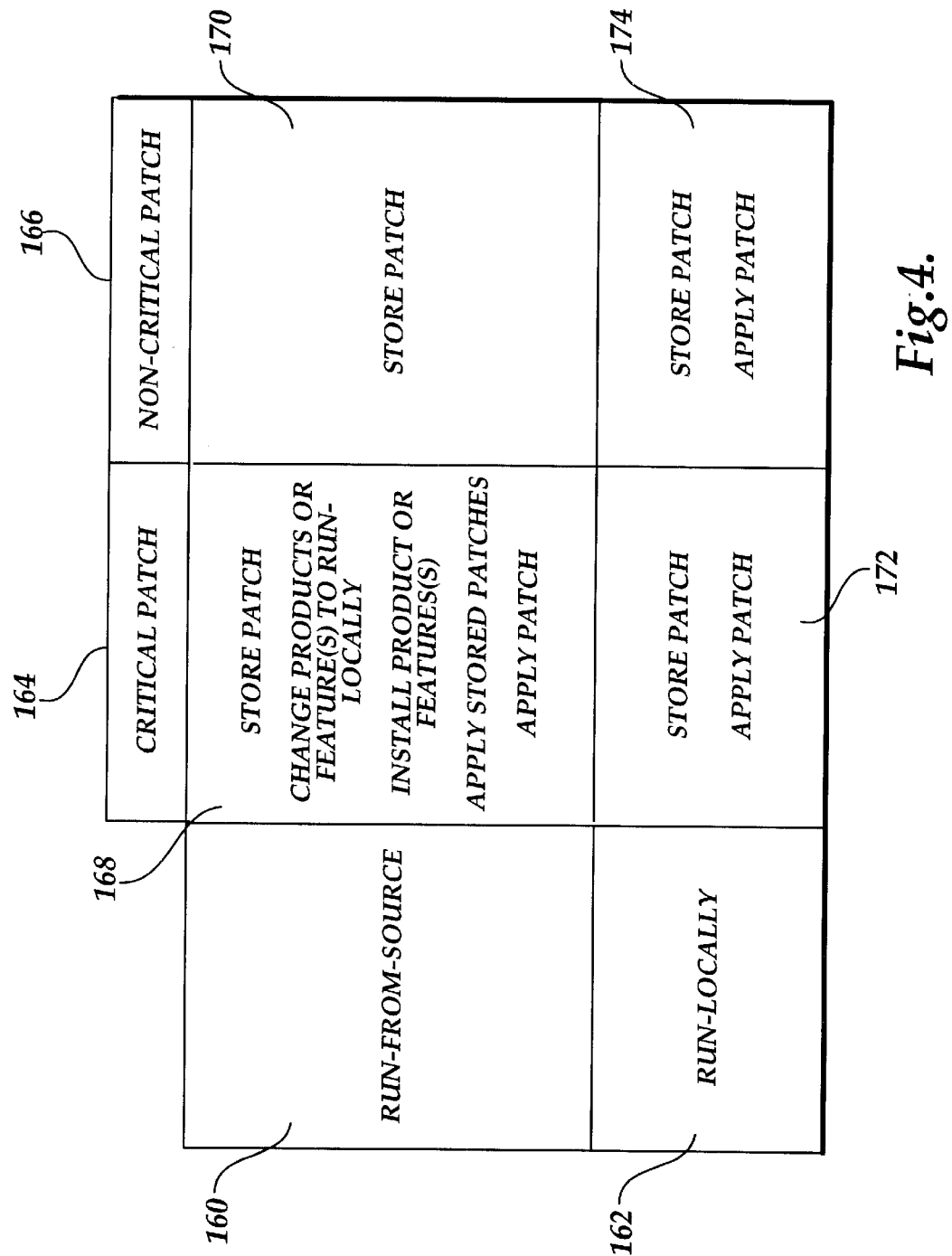
FIG. 4 is a table illustrating the logic of preserving an execution format after patching an application as shown in FIG. 2.

FIG. 4 is a table illustrating the logic of FIG. 2. The left hand column indicates the execution format for each row of the table. There is a row for the Run-From-Source execution format 160, and a row for the Run-Locally execution format 162. Across the top are designations for each column of the table indicating whether the patch is critical 164 or non-critical 166. In all cases (i.e., both Run-From-Source and Run-Locally for both critical and non-critical patches), the patch is stored. See table entries 168, 170, 172, and 174. Additionally, if the execution format is Run-Locally, the patch is applied regardless of whether or not the patch is critical. See table entries 172 and 174. If the execution format is Run-From-Source and it is a critical patch, the execution format is changed to Run-Locally, the product or feature(s) are installed, previously stored patches are applied, and the patch is applied. See table entry 168.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A computer-implemented method for installing a patch to a computer application based on the criticality of the patch and the application execution format, comprising:
   (a) determining if there are any features of the computer application affected by the patch;
   (b) if there are any affected features, determining the execution format for the affected features, wherein the execution format is Run-Locally or Run-From-Source; and
   (c) if the execution format is Run-From-Source:
      (i) determining if the patch is critical; and
      (ii) if the patch is critical, performing a Run-Locally installation.

2. The method of claim 1, further comprising storing the patch.

3. The method of claim 1, wherein a Run-Locally installation comprises:
   (a) installing one or more features of the computer application;
   (b) updating a configuration database to reflect that the installed features have an execution format of Run-Locally;
   (c) determining if there are any available patches for the installed features; and
   (d) if there are any available patches for the installed features:
      (i) installing the available patches; and
      (ii) updating the configuration database to reflect that the available patches have been installed.

4. The method of claim 1, further comprising installing one or more features of the computer application prior to determining the execution format.

5. The method of claim 4, wherein the installation of a feature comprises:
   (a) obtaining the execution format;
   (b) if the execution format is Run-Locally, loading one or more product files;
   (c) storing a path to the product files; and
   (d) storing a information about the product installation in a configuration database.

6. The method of claim 5, wherein the configuration database comprises the execution format.

7. The method of claim 1, wherein the patch comprises a patch information store, said patch information store including a critical field.

8. A computer-readable medium having computer executable instructions for performing the method recited in any one of claims 1–7.

* * * * *

UNITED STATES PATENT AND TRADEMARK OFFICE
CERTIFICATE OF CORRECTION

PATENT NO. : 6,427,236 B1
DATED : July 30, 2002
INVENTOR(S) : B.C. Chamberlain et al.

It is certified that error appears in the above-identified patent and that said Letters Patent is hereby corrected as shown below:

Title page,
Item [57] ABSTRACT,
Line 5, "also-" should read -- also --

Column 1,
Line 35, "each." should read -- each --

Column 2,
Line 6, "of whether" should read -- of choosing whether --
Line 26, "a method," should read -- a method --

Column 3,
Line 4, "Run-locally" should read -- Run-Locally --

Column 5,
Line 53, "If however" should read -- If, however, --

Column 6,
Line 10, "If however" should read -- If, however, --
Line 54, "product form" should read -- product from --
Lines 59-60, "feature
      (s)" should not break Column 7,
Line 1, "patch, for example," should read -- patch; for example; --
Lines 4-5, "feature
      (s)" should not break
Line 9, "(no" should read -- ("no" --

UNITED STATES PATENT AND TRADEMARK OFFICE
CERTIFICATE OF CORRECTION

PATENT NO.    : 6,427,236 B1
DATED         : July 30, 2002
INVENTOR(S)   : B.C. Chamberlain et al.

It is certified that error appears in the above-identified patent and that said Letters Patent is hereby corrected as shown below:

<u>Column 8,</u>
Line 32, "storing a information" should read -- storing information --

Signed and Sealed this

Twelfth Day of August, 2003

JAMES E. ROGAN
*Director of the United States Patent and Trademark Office*